United States Patent
Ziehr et al.

(10) Patent No.: US 7,287,581 B2
(45) Date of Patent: Oct. 30, 2007

(54) FULL FUNCTION VEHICLE HVAC/PTC THERMAL SYSTEM

(75) Inventors: Lawrence P. Ziehr, Clarkston, MI (US); Gregory A. Major, Beverly Hills, MI (US); June S. Bian, Northville, MI (US)

(73) Assignee: General Motors Corporation, Detroit, MI (US)

( * ) Notice: Subject to any disclaimer, the term of this patent is extended or adjusted under 35 U.S.C. 154(b) by 463 days.

(21) Appl. No.: 10/739,432

(22) Filed: Dec. 18, 2003

(65) Prior Publication Data

US 2005/0133215 A1 Jun. 23, 2005

(51) Int. Cl.
*B60H 1/00* (2006.01)
*B60H 3/00* (2006.01)
*F25B 29/00* (2006.01)

(52) U.S. Cl. ............ 165/202; 240/241; 240/242; 240/42; 240/43; 62/238.6; 62/238.7; 62/160; 62/503; 62/509; 62/324.6; 237/2 A; 180/65.2; 180/65.4

(58) Field of Classification Search ........... 165/202, 165/240, 241, 242; 62/238.7, 238.6, 503, 62/509, 324.6, 160; 237/2 A; 180/65.2, 180/65.4
See application file for complete search history.

(56) References Cited

U.S. PATENT DOCUMENTS 4,128,111 A * 12/1978 Hansen et al. ............ 137/515.7
5,265,438 A * 11/1993 Knowles et al. ............ 62/324.6
5,497,941 A * 3/1996 Numazawa et al. ........ 237/2 A
5,706,670 A * 1/1998 Voorhis ..................... 62/324.6
5,966,960 A * 10/1999 Cummings et al. ........... 62/296
6,094,930 A * 8/2000 Zeng et al. ................. 62/509
6,606,879 B1 * 8/2003 Telesz ......................... 62/503
2001/0013409 A1 * 8/2001 Burk et al. ................. 165/240

OTHER PUBLICATIONS

Derwent-Acc-No. 2003-164410, corresponding to KR 2002072347 A, Sep. 14, 2002, Abstract and drawing figure.*

* cited by examiner

*Primary Examiner*—John K. Ford

(57) ABSTRACT

The integrated automotive HVAC/PTC system of the present invention includes a bi-fluidic heat exchanger between an air conditioning subsystem and a heating subsystem which enables heat extracted during dehumidification of the ventilation air to be transferred into dehumidified ventilation air. The HVAC/PTC system includes reconfigurable coolant loops and reconfigurable refrigerant loops, some of which act in concert and some of which may be isolated. Power train components, including the power supply, may be grouped by heat transfer requirements and may be cooled or heated as needed. Power train cooling is accomplished with coolant in the heating subsystem chilled by the air conditioning system.

4 Claims, 2 Drawing Sheets

FULL FUNCTION VEHICLE HVAC/PTC THERMAL SYSTEM

BACKGROUND OF THE INVENTION

1. Technical Field

The present invention relates generally to the field of motor vehicle heating, ventilation, and air conditioning (HVAC) systems and to vehicle power train cooling (PTC) systems and more particularly to a hybrid thermal control system for vehicles.

2. Background Art

Although the traditional internal combustion engine is still the most widely accepted power plant for mainstream motor vehicles, other types of vehicles are making inroads into the consumer marketplace. For example, electric and hybrid electric vehicles are becoming increasingly popular for certain consumer segments. Similarly, fuel cell engines and high-efficiency diesel engines are also growing in popularity as attractive alternatives to the standard gasoline powered engine. As automakers seek to accommodate these various trends in consumer buying habits, the process of designing and manufacturing vehicles that incorporate these new engines is also changing.

For example, in order to meet the rapidly growing demand for electric vehicles, many automakers are seeking to "retrofit" existing internal combustion engine vehicle designs with electric engines. This process includes changing out the engine and related components as necessary to accommodate the change in propulsion systems. Obviously, the manufacturer would like to change as few components as necessary in order to minimize costs and reduce the amount of time that it takes to get a new electric powered vehicle into production. While many of the components can be the same, regardless of the type of engine, certain components may be removed or added when updating an existing vehicle design to accommodate a battery powered engine. One area where this is most noticeable is the HVAC system for the vehicle.

Specifically, while traditional internal combustions engines generate excess heat that can be used for the various heating needs of the vehicle, such as heating the passenger cabin during cooler weather, most electric vehicle engines do not generate much excess heat. Similarly, the cooling requirements for an electric vehicle are also different in that cooling may be provided for certain additional components such as the electric vehicle's batteries. In addition, since many electric vehicles utilize heat pumps, different HVAC components may be added to a vehicle when an electric engine is to be installed. This variation in heating and cooling requirements for different types of engines translates to additional design and manufacturing time as well as increased cost for introducing new vehicles into the marketplace. Accordingly, to the extent possible, manufacturers seek additional opportunities to quickly and efficiently update existing vehicle designs and to use existing subsystems to accommodate new and emerging engine technologies.

In view of the foregoing, it should be appreciated that it would be desirable to provide methods and apparatus for minimizing the amount of time and money required by automakers to re-design existing vehicles for new and emerging engine technologies. Specifically, the ability to minimize design changes can provide the manufacturer with manufacturing flexibility, increased production capacity and shorten time to market. In addition, a single thermal system, adaptable to meet all of a vehicle's thermal requirements, would be desirable. Furthermore, additional desirable features will become apparent to one skilled in the art from the foregoing background of the invention and following detailed description of a preferred exemplary embodiment and appended claims.

SUMMARY OF THE INVENTION

The present invention comprises a full-function vehicle thermal system further comprising a refrigerant-based automotive air conditioning subsystem which is reconfigurable to create one of a plurality of possible refrigerant loops, wherein each refrigerant loop of the plurality of possible refrigerant loops comprises a bidirectional orifice separator.

BRIEF DESCRIPTION OF THE DRAWINGS

The preferred exemplary embodiments of the present invention will hereinafter be described in conjunction with the appended drawing, where like designations denote like elements, and.

DETAILED DESCRIPTION OF A PREFERRED EMBODIMENT

Figure 1:
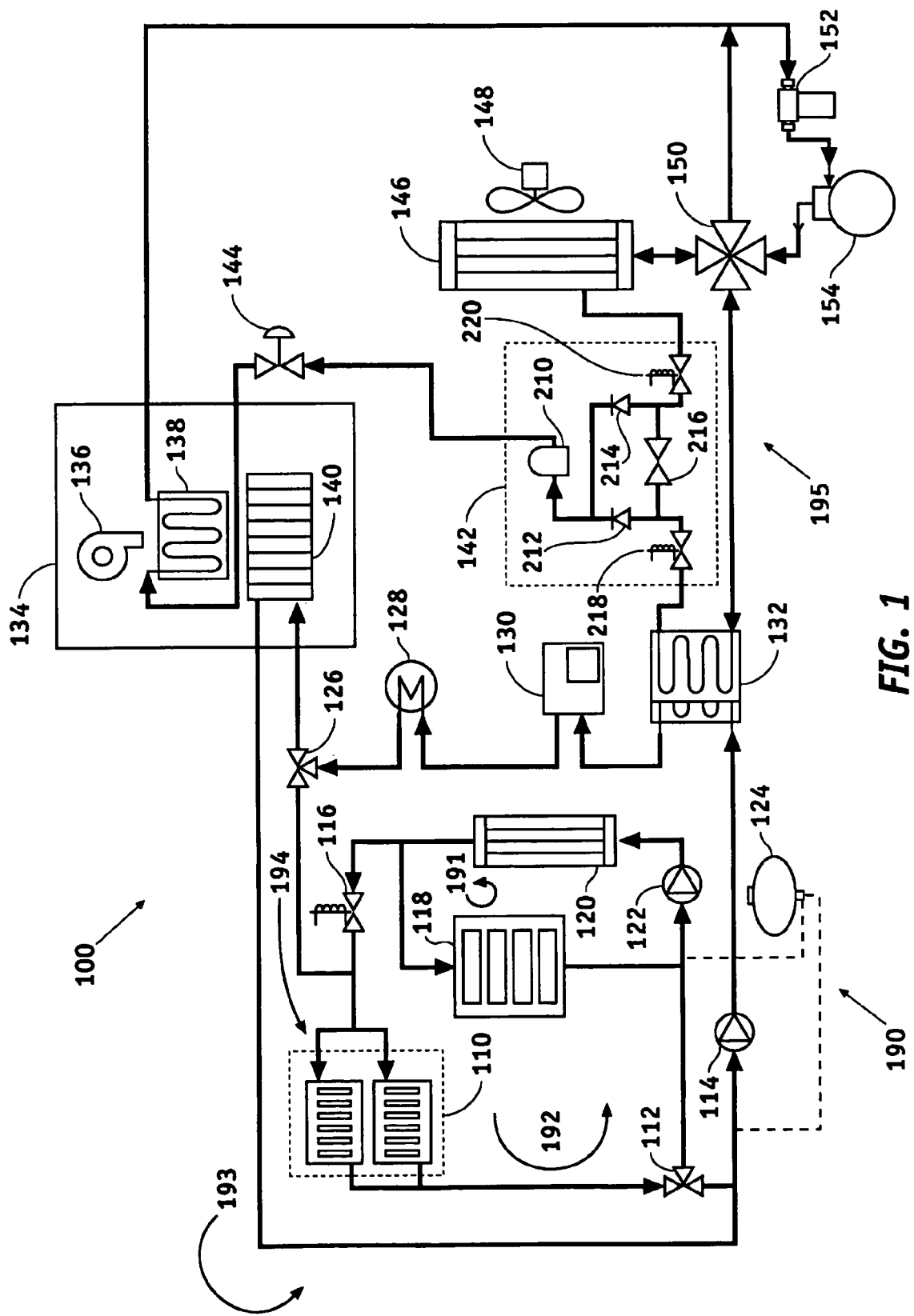
FIG. 1 is a schematic block diagram of an HVAC/PTC thermal system in accordance with an exemplary embodiment of the full function vehicle HVAC/PTC thermal system.

FIG. 1 shows an exemplary embodiment of a full-function vehicle HVAC/PTC thermal system 100, comprising an integrated heating, ventilation, air conditioning and power train cooling (HVAC/PTC) system. Thermal system 100 may also provide heating for some power train components 118 and 110. The connections joining the various components of system 100 may generally be characterized as tubes, channels, or piping used to transfer various coolants or refrigerants from one location to another within thermal system 100. In some instances the refrigerant is in a liquid state and in other places the refrigerant will be in a gaseous state with the refrigerant changing states to provide a thermal transfer mechanism. Thermal system 100 comprises a refrigerant-based air conditioning subsystem, a coolant-based heating subsystem, and integrating components.

Power train components 110 and 118 comprise channels and/or plenums for coolant. Hereinafter, channeling coolant to a power train component, by any means, is to be understood to refer to channeling coolant to the channels and/or plenums in that power train component. Each of power train components 118 and 110 may represent a plurality of power train components.

Thermal system 100 comprises a refrigerant-based automotive air conditioning subsystem 195 integrated with a coolant-based automotive heating subsystem 190. The refrigerant-based air conditioning subsystem 195 comprises an evaporator 138 in HVAC unit 134, an outside air heat exchanger (OEX) 146 with fan assembly 148, an accumulator 152, a compressor 154, a 4-way reversing valve 150, a refrigerant side of a bi-fluidic heat exchanger (BEX) 132, bidirectional orifice separator 142, and a thermostatic expansion valve (TXV) 144. HVAC unit 134 comprises a blower fan 136, an evaporator 138, a heater core 140, and ductwork comprising blend actuators. The heater core 140 is part of the heating subsystem. Blower fan 136 blows ventilation air over evaporator 138, which cools and dehumidifies the ventilation air. During the dehumidification process, heat from the blown ventilation air may be transferred into the evaporator 138 and into the refrigerant circulating through the evaporator 138. The cooled dehumidified ventilation air may be propelled further to cross over the heater core 140. Heater core 140 transfers heat into the cooled dehumidified ventilation air from the hot coolant circulating through the heater core 140. As will be seen in more detail below, heat transferred from the ventilation air into the refrigerant during dehumidification may be further transferred into the coolant and then back into the cooled dehumidified ventilation air. Blend actuators in the HVAC unit 134 determine the mixture of ventilation airs (i.e., inside air with outside air, heated dehumidified air with unheated dehumidified air, etc) in response to user inputs.

The coolant-based automotive heating subsystem 190 comprises heater core 140, coolant pumps 114 and 122, heat exchanger 120, a coolant reservoir 124, valves 112, 116, and 126, and components which potentially transfer heat into the circulating coolant. Potentially heat-transferring components comprise a fuel operated heater 130, an electrical coolant heater 128, a coolant side of the bi-fluidic heat exchanger (BEX) 132, and power train components 118, including power supply 110. Power supply 110 may comprise a battery, a fuel cell, a capacitor, or a capacitor bank. Other exemplary power train components 118 comprise a motor, a power inverter module, a high voltage interface box, and an auxiliary power module. Heat transfer between the potentially heat-transferring components 110, 118, 128, 130, and 132 may be via thermal conduction into coolant circulating through plenums or channels thermally connected to the components 110, 118, 128, 130, and 132. BEX 132 comprises a refrigerant side having a refrigerant channel, or coil, a coolant side having a coolant channel, or coil, and thermally conductive pathways between the refrigerant and the coolant.

Each of the subsystems 190, 195 may be reconfigurable to create a plurality of coolant loops and refrigerant loops, respectively. The system 100 may best be described in terms of the loops.

Subsystem 190 comprises a continuous power train cooling loop 191 for power train components 118. Power train components 118 may be divided and isolated physically and thermally based upon different heat transfer requirements. In exemplary embodiment 100, power train components 118 may represent power train components which need constant cooling, while power train components 110 may represent components which need occasional cooling and occasional heating, depending upon environmental factors. For example, power train components 118 may include the motor and power conditioning components, and power train components 110 may be a power supply 110 such as batteries 110. Heat exchanger 120, which may be radiator 120, power train components 118, and radiator coolant pump 122 may comprise a closed coolant loop 191 that may operate continuously to cool only power train components 118.

Coolant shutoff valve 116 may open to extend the closed loop 191 to form loop 192 by opening a channel between radiator 120 and power train components 110 when heater/battery 3-way valve 126 and coolant pumps 3-way valve 112 close the channels to heater core 140. Loops 191 and 192 may operate simultaneously. A plurality of such loop extensions, using a plurality of coolant shutoff valves 116 and coolant pumps 3-way valves 112 may be used in alternate embodiments having power train components 118 and 110 with 3 or more distinct heat transfer requirements. In some embodiments, radiator 120 may transfer heat into the passenger cabin of the vehicle during very cold weather and transfer heat to outside air in warm weather.

With the power train components 118 and 110 in closed loop configurations 191 and 192, heater core 140 comprises part of a coolant loop 193. Loops 191, 192 and 193 may operate simultaneously. Coolant loop 193 further comprises BEX pump 114, the coolant side of BEX 132, fuel operated heater 130, electrical coolant heater 128, and heater/battery 3-way valve 126. Coolant flows out of the heater core 140 to the BEX pump 114, which pumps coolant through the coolant side of BEX 132. BEX 132 comprises a bi-fluidic heat exchanger, comprising a coolant channel, or coil, thermally connected to a refrigerant channel, or coil. For example, the refrigerant coil may be welded directly to the coolant coil for heat transfer through the coil walls. For another example, the coils may be connected by thermally conductive webbing. The present invention contemplates a wide range of approaches in the design of the BEX 132.

When loop 193 is operating, heat from the refrigerant may be transferred into the coolant in BEX 132. The coolant may continue to circulate through the fuel-operated heater 130 and the electrical coolant heater 128. The coolant heaters 128 and 130 are optional. In extremely cold weather, the heat transferred into the coolant in the BEX 132 may not be sufficient to provide comfortably warm air in the passenger cabin. In such cases, the coolant may be actively heated by fuel-operated coolant heater 130 or electrical coolant heater 128. The heated coolant circulates through heater/battery 3-way valve 126 and back to the heater core 140 where heat may be transferred to blown ventilation air in HVAC unit 134. One or both of the power train component 118 and/or 110 coolant loops 191 and/or 192 may run concurrently with the passenger cabin heating loop 193.

In come configurations of the HVAC unit 134, blend actuators within the HAVC unit 134 may direct air heated by the heater core 140 in loop 193 to a destination other than the passenger cabin. For example, on a hot, dry day, when a first or fourth refrigerant loop (discussed more fully below) may be transferring heat into coolant through the BEX 132, at least a portion of the heated ventilation air may be directed to outside air. Likewise, HAVC unit 134 may receive input air from either the passenger cabin, another defined interior space, the outside ambient atmosphere, or some combination thereof.

In the loop 194 configuration, heater/battery 3-way valve 126 channels coolant to power train components 110 instead of heater core 140. Coolant pumps 3-way valve 112 channels coolant from the power train components 110 to the BEX pump 114, which pumps the coolant through the BEX 132 and coolant heaters 130 and/or 128, and then through battery/heater 3-way valve 126. Loop 194 may be used for transferring heat from refrigerant in the BEX 132 to power train components 110. Note that the coolant loop 191 may continue to run and cool the remaining power train components 118 while the power train components 110 are being heated. For example, in an embodiment using batteries as power train components 110, the batteries 110 may require heating during extremely cold weather or at start-up. Loop 194 may also be used, depending on the configuration of subsystem 195, to transfer heat to the refrigerant in the BEX 132. In this configuration, loop 194 may be used to cool power train components 110. For example, after start-up, batteries 110 may require cooling.

In an alternate embodiment, power train components 118 may be fluidically connected in series to a coolant-to-coolant heat exchanger (not shown) between BEX 132 and BEX pump 114, allowing the heat from the power train components 118 to be used for warming the passenger cabin through heater core 140. In variations of this alternate embodiment, power train components 118 may be configured to transfer heat into any segment of the coolant heating line 114, 132, 130, 128, 126 or out of the coolant heating line 114, 132, 130, 128, 126, as needed. If the heat transferred from the power train components 118 is insufficient to meet cabin-heating needs, coolant heaters 128 and 130 may compensate. If the heat transferred from the power train components 118 is excessive, the power train components 118 can be switched out of the coolant heating line 114, 132, 130, 128, 126. In a further variation of this alternate embodiment, radiator coolant pump 122 may be turned off when heat is being transferred from second plenums. In a particular embodiment preferred for strong hybrid vehicles, the coolant heater 130 may be a heat exchanger for exchanging heat between the power train components 118 and the coolant.

In some embodiments, all power train components 188 and 110 may be alternately heated, cooled, or neither heated nor cooled. In yet other embodiments, all power train components 188 and 110 may only be cooled or not cooled. In still other embodiments, all power train components may only be heated or not heated.

The air conditioning subsystem comprises compressor 154, 4-way reversing valve 150, outside air heat exchanger (OEX) 146 with fan assembly 148, bidirectional orifice separator 142 comprising valves 218 and 220, thermostatic expansion valve (TXV) 144, evaporator 138, and accumulator 152. As an alternate parallel path to the OEX 146, the air conditioning subsystem further comprises a refrigerant side of the BEX 132. Except for the bidirectional orifice separator 142, the components of the air conditioning system are individually well known off-the-shelf components. The use of off-the-shelf components is an advantage of the design of the full function vehicle HVAC/PTC thermal system 100.

The bidirectional orifice separator 142 is a novel device enabling, in concert with 4-way reversing valve 150, parallel heat exchangers 132 and 146 to be used alternately as condensers or in combination as evaporator-condenser pairs, either OEX 146 or the refrigerant side of BEX 132 serving either as the condenser or as the evaporator. The effect of the bidirectional orifice separator 142 may be determined by the states of transfer valves 218 and 220. Transfer valves 218 and 220 comprise shut off valves in a reversible flow channel. Transfer valves 218 and 220 may be both open or one open and one closed, depending on the desired result.

When both transfer valves 218 and 220 are open, refrigerant will flow through orifice tube 216, which expands the refrigerant. Expanding refrigerant produces refrigerant with a lower pressure and a lower temperature and comprises a preliminary step to evaporating the refrigerant. Orifice tube 216 comprises a bidirectional orifice tube, so the flow of refrigerant may be from either direction. The direction of refrigerant flow may be determined by the state of the 4-way reversing valve 150.

The 4-way reversing valve 150 is a bi-stable valve which receives compressed hot refrigerant from compressor 154 through a dedicated input channel, that channel indicated in FIG. 1 by the arrow head on the line from compressor 154. Compressor 154 may be an electrical compressor 154 and may include a compressor motor controller. The 4-way reversing valve 150 also has a dedicated output channel to a suction side of compressor 154. In a first bi-stable state, the 4-way reversing valve 150 channels hot compressed refrigerant to the OEX 146 and fluidically connects the suction side of compressor 154 to the BEX 132. In a second bi-stable state, the 4-way reversing valve 150 channels hot compressed refrigerant to the BEX 132 and fluidically connects the suction side of compressor 154 to the OEX 146. The configuration of the air conditioning subsystem 195 in either bi-stable state of the 4-way reversing valve 150 depends on the states of transfer valves 218 and 220.

A first refrigerant loop may be formed when the BEX 132 is receiving compressor 154 outflow, valve 218 is open, and valve 220 is closed. The received refrigerant may be condensed in the refrigerant side of the BEX 132, transferring heat to the coolant side of BEX 132. The condensed refrigerant moves through transfer valve 218 and check valve 212 to receiver 210, which makes a liquid component of the condensed refrigerant available to TXV 144. Liquid refrigerant flows from TXV 144 to the evaporator 138 in HVAC unit 134. The evaporator 138 transfers heat from the ventilation air to the refrigerant, which evaporates. Heat loss in the ventilation air creates cooled and dehumidified ventilation air. The evaporated refrigerant flows to the suction side of compressor 154 through accumulator 152, which completes the first refrigerant loop.

OEX 146 may be isolated from the first refrigerant loop. Although one port of the OEX 146 may be fluidically connected to the suction side of compressor 154 through accumulator 152, no refrigerant flows from OEX 146 because the other port of OEX 146 is fluidically connected to valve 220. Valve 220 is closed, leaving the compressor 154 to suck on a closed valve 220, which produces no flow. The suction from compressor 154 is instead applied to the output of evaporator 138.

The first refrigerant loop may be used in concert with loop 193. Loop 193 receives heat from the refrigerant, which heat may be transferred to the coolant in the BEX 132. The heat may be discharged from loop 193 in the heater core 140, where the heat may be transferred to cooled, dehumidified ventilation air to make warmer dehumidified ventilation air. Accordingly, the first refrigerant loop and loop 193 act in concert to extract heat from the ventilation air during cooling and dehumidification and return the extracted heat to the cooled dehumidified air. The reuse of the heat of dehumidification to warm the dehumidified air provides improved efficiency of operation for thermal system 100.

The first refrigerant loop may also be used in concert with loop 194. Loop 194 receives heat from the BEX 132 and uses it to warm power train components 110, such as batteries 110. Heat from BEX 132 may make it unnecessary to consume fuel and/or electricity in coolant heaters 130 and 128, thereby improving the efficiency of thermal system 100.

The first refrigerant loop may be used concurrently with loops 191, 192 and 193 if loop 194 is not in use. Coolant heaters 128 and 130 are normally OFF when the first refrigerant loop is running. However, if the heat transferred through the BEX 132 is inadequate for cabin heating needs, then coolant heaters 128 and 130 may be ON.

A second refrigerant loop may be formed when the OEX 146 is receiving compressor 154 outflow, transfer valve 218 is closed, and transfer valve 220 is open. In this configuration, the BEX 132 may be isolated from the second refrigerant loop just as the OEX 146 may be isolated in the first refrigerant loop. When the BEX 132 is isolated, there may be no integrated activity between subsystems 190 and 195. Accordingly, the second refrigerant loop is very nearly a conventional air conditioning loop, differing only in that it is switched to by, and includes elements 220, 214, 210 of, the bidirectional orifice separator 142. The second refrigerant loop may be used concurrently with loops 191, 192, and 193 or with loops 191 and 194, or with loops 191 and 193. Coolant heaters 128 and 130 may be ON when the second refrigerant loop is in use.

A third refrigerant loop may be formed when both transfer valves 218 and 220 are open and the OEX 146 is receiving compressor 154 outflow through 4-way reversing valve 150. In this configuration, OEX 146 acts as a condenser. OEX 146 transfers heat to the outside air and condensed refrigerant flows out of OEX 146, through valve 220, through bidirectional orifice tube 216, through valve 218 and through the refrigerant side of BEX 132 to the suction side of compressor 154 through accumulator 152. Bidirectional orifice tube 216 expands the condensed refrigerant. The refrigerant side of BEX 132 acts as an evaporator, cooling the coolant side of BEX 132.

Neither the third refrigerant loop nor the fourth refrigerant loop, discussed in more detail below, isolates evaporator 138. In the third refrigerant loop, enough condensed refrigerant flows through check valve 214 to receiver 210 to keep the TXV 144 supplied with liquid refrigerant. TXV 144 comprises an integral temperature sensor which attaches to the output channel of evaporator 138. Conventionally, TXV 144 has a continuous range of flow restrictions between fully open and closed. The flow restriction varies automatically as a function the temperature at the output of evaporator 128 and a pre-selected setting. TXV 144 acts to maintain a constant temperature difference between the evaporator 138 output and the pre-selected setting by providing more refrigerant to evaporator 138 when the output temperature rises and less when the output temperature falls. The state of TXV 144 determines the demand for refrigerant from receiver 210 in bidirectional orifice separator 142. The demand on receiver 210 affects the pressure at the output of the check valves 212 and 214. In the third and fourth refrigerant loops (both transfer valves 218 and 220 open), the pressure at the output of the orifice tube 216 may be determined by the suction of the compressor 154. If the TXV 144 increases flow to the evaporator 138, the pressure difference across check valve 214 (third refrigerant loop) will increase and more of the refrigerant will flow through the check valve 214 and less refrigerant will flow through the orifice tube 216. Accordingly, in any refrigerant loop, the TXV 144 will always have sufficient coolant to operate evaporator 138. Any of the refrigerant loops may extract heat from the ventilation air in HVAC unit 134.

The third refrigerant loop may be used in concert with loop 194 to cool power train components 110. The third refrigerant loop dumps the heat extracted from dehumidification to the outside air though OEX 146 as a necessary sacrifice to keep critical power train components 110 cool. Loop 191 may run concurrently with the third refrigerant loop and loop 194. Coolant heaters 128 and 130 are OFF when the third refrigerant loop is used with loop 194.

The fourth refrigerant loop may be formed when both transfer valves 218 and 220 are open and the BEX 132 is receiving compressor 154 outflow. In this configuration, the refrigerant side of BEX 132 acts as a condenser and condensed refrigerant flows out of the refrigerant side BEX 132, through valve 218, through bidirectional orifice tube 216, through valve 220 and through OEX 146 to the suction side of compressor 154 through accumulator 152. Bidirectional orifice tube 216 expands the condensed refrigerant. The OEX 146 acts as an evaporator, cooling the outside air. The refrigerant side of BEX 132 transfers heat to the coolant side of BEX 132.

The fourth refrigerant loop may be used with loop 193 to recycle heat transferred into coolant through the BEX 132. Heat may then be transferred through the heater core 140 to warm the ventilation air. A portion of the heat transferred through the BEX 132 in the fourth refrigerant loop comprises heat originally transferred into evaporator 138 during dehumidification. That originally transferred heat may be contained in the refrigerant which mixes in accumulator 152 with refrigerant from the OEX 146 and may be sent into the refrigerant side of BEX 132 by the compressor 154.

The fourth refrigerant loop may be used in concert with loop 194 to heat power train components 110. Loop 191 may run concurrently with the fourth refrigerant loop. Loop 192 may run concurrently with the fourth refrigerant loop if loop 194 is not running, as when the heat transferred through the BEX 132 is routed to the heater core 140. Coolant heaters 128 and 130 may be ON when the fourth coolant loop is running.

Outside air heat exchange unit (OEX) 146 and fan assembly 148 are used to effectuate heat transfers from thermal system 100 to the ambient atmosphere outside the vehicle containing thermal system 100. In an embodiment, the fan assembly 148 may comprise a variable speed fan, the fan speed responsive to vehicle speed and cooling needs of thermal system 100.

In a particular embodiment, the 4-way reversing valve 150 comprises a valve integral to the bidirectional orifice separator 142. In a variation of the particular embodiment, an electronic valve controller may also be integrated with the 4-way reversing valve 150 and the bidirectional orifice separator 142.

Figure 2:
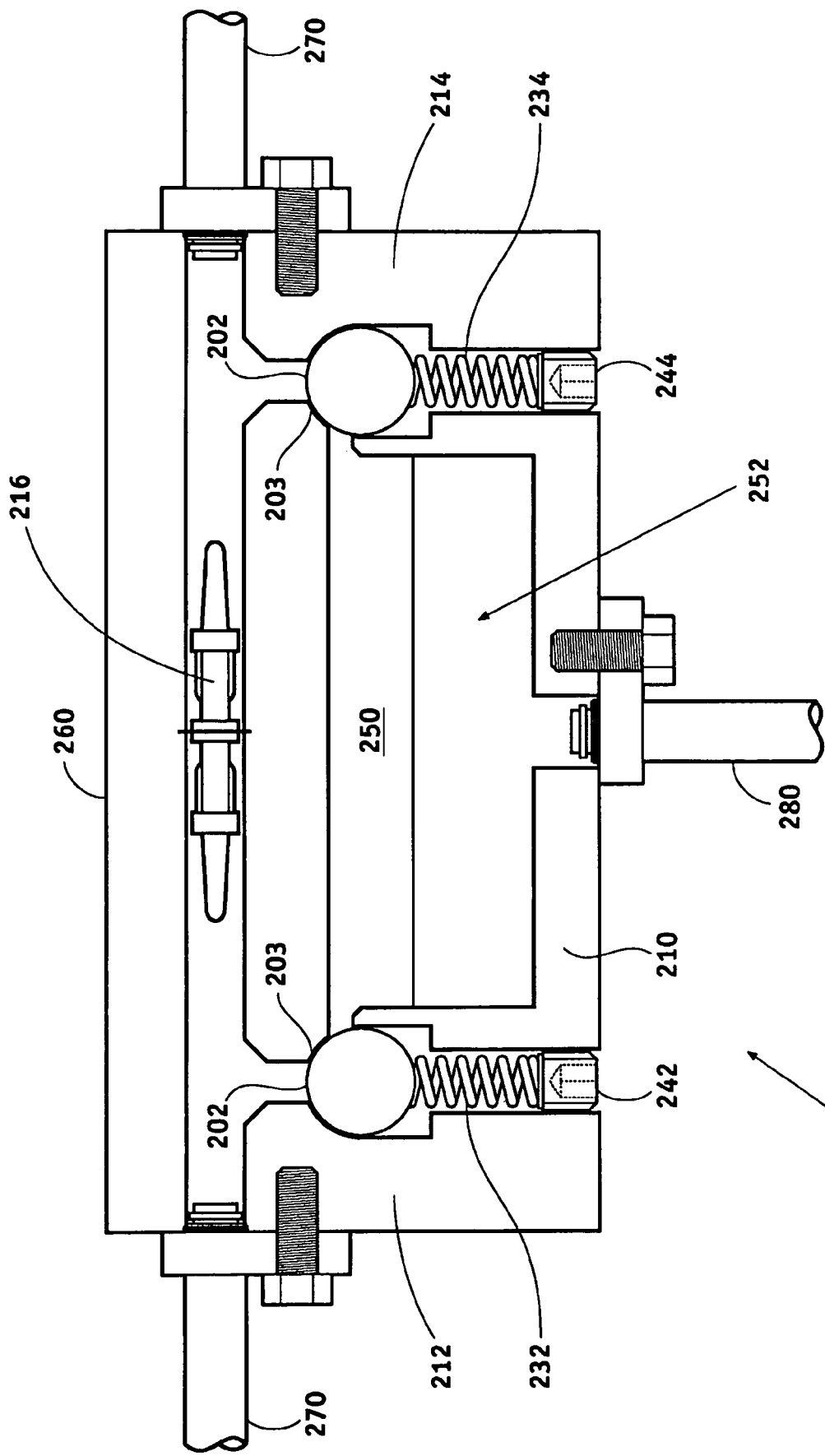
FIG. 2 is a vertical section view through an exemplary bidirectional orifice separator.

FIG. 2 shows a vertical section of an exemplary embodiment of a bidirectional orifice separator 200 comprising a bidirectional orifice tube 216 fluidically connected to the inputs of check valves 212 and 214 which control the entry of refrigerant into receiver 210. Check valves 212 and 214 and receiver 210 are labeled in the drawing by reference to portions of structure encasing them. Check valves 212 and 214 may comprise ball 202 and seat 203 valves, but other types of check valves are also contemplated. Check valves 212 and 214 may be biased by biasing mechanisms 232 and 234, respectively. The bias may be an adjustable bias. For example, screw-type adjustments 242 and 244 may be employed to bias the compression of spring biasing mechanisms 232 and 234. Receiver 210 comprises a chamber for containing refrigerant 250 and 252. Removable cover 260 provides access to the orifice tube 216 for maintenance.

Channels 270 may be fitted with valves 218 and 220 (FIG. 1). Refrigerant may enter through either or both channels 270. If fluid enters from one channel 270 and the other channel 270 is closed, there is no flow through the bidirectional orifice tube 216. Refrigerant may flow through the check valve 212 or 214 closest to an inlet channel 270 and into receiver 210. In receiver 210, the refrigerant will separate into liquid refrigerant 252 and gaseous refrigerant 250. Liquid refrigerant 252 may flow out of bottom of the receiver 210 and through channel 280 to a TXV 144 (FIG. 1).

If refrigerant flows into one (inlet) channel 270 and out the other (outlet) channel 270, then refrigerant will flow through the bidirectional orifice tube 216. The refrigerant flowing through the bidirectional orifice tube 216 will be expanded to a lower pressure and temperature before exiting through the outlet channel 270. The bidirectional orifice tube 216 creates some flow resistance and back pressure at the check valve 212 or 214 nearest the inlet channel 270. The check valve 212 or 214 nearest the inlet channel 270 is adjusted to allow some refrigerant into the receiver 210.

The bidirectional orifice separator 200 is adapted for reversible flow, enabling heat exchangers fluidically connected to channels 270 (e.g. 132 and 146 of FIG. 1) to operate as a reversible evaporator-condenser pair. The bidirectional orifice separator may also operate with only one heat exchanger.

In summary, the exemplary embodiments of the present invention provide a thermal system that utilizes many existing components from more traditional internal combustion engines while accommodating various new and more efficient engine technologies. Additionally, vehicle range can be improved because energy normally lost as waste heat can be more efficiently utilized by the thermal system. Another benefit is the capability of using a single thermal system to provide temperature control for passenger comfort as well as vehicle-related heating and cooling needs for the engine, motor, electric batteries, etc. A novel device, a bidirectional orifice separator 142, enables the flexibility the system needs to meet such a broad set of requirements.

From the foregoing description, it should be appreciated that an apparatus is provided for an automotive thermal system adapted to new and emerging engine technologies. While an exemplary embodiment has been presented in the foregoing detailed description of the exemplary embodiment, it should be appreciated that a vast number of variations in the embodiments exist. For example, although the various embodiments of the present invention have been described in the context of electric vehicles, those skilled in the art will recognize that the principles and techniques of the exemplary embodiments are readily adaptable for other engine technologies such as hybrid electric vehicles, fuel cell vehicles, high-efficiency diesel vehicles, and the like.

It should also be appreciated that the exemplary embodiments are only examples, and are not intended to limit the scope, applicability, or configuration of the invention in any way. Rather, the foregoing detailed description provides those skilled in the art with a convenient road map for implementing the exemplary embodiments of the invention. It should also be understood that various changes may be made in the function and arrangement of elements described in the exemplary embodiments without departing from the spirit and scope of the invention as set forth in the appended claims. For example, any number of power train component cooling and heating loops may be included to deal with for an equal number of different heating and cooling requirements.

The invention claimed is:

1. A thermal system for an electrically-powered vehicle having a power train, the thermal system comprising:
a reconfigurable refrigerant-based automotive air conditioning system to selectively create a plurality of possible refrigerant loops, the refrigerant-based automotive air conditioning system comprising:
an evaporator having refrigerant channels thermally connected to ventilation air and configurable to receive previously cooled refrigerant, the evaporator operable to cool and dehumidify the flow of ventilation air;
a bi-fluidic heat exchanger having refrigerant channels thermally coupled to coolant channels;
an outside air heat exchanger;
a bidirectional orifice separator within at least one refrigerant loop of the plurality of possible refrigerant loops, the bidirectional orifice separator comprising:
a first shutoff valve fluidically coupled to the bi-fluidic heat exchanger;
a second shutoff valve fluidically coupled to the outside air heat exchanger; and
a bidirectional orifice tube coupled in series between the first shutoff valve and the second shutoff valve for expanding refrigerant when the first and second shutoff valves are open;
a compressor;
an accumulator fluidically coupled to an input of the compressor; and
a 4-way reversing valve configured to receive compressed refrigerant from the compressor and operable to discharge compressed refrigerant into a selected one of the bi-fluidic heat exchanger and the outside air heat exchanger and to receive refrigerant from the non-selected one of the bi-fluidic heat exchanger and the outside air heat exchanger to discharge refrigerant from the non-selected one of the bi-fluidic heat exchanger and the outside air heat exchanger to the accumulator; and
a reconfigurable liquid-coolant-based automotive heating system to selectively create a plurality of possible coolant loops, wherein the refrigerant-based automotive air conditioning system and the liquid-coolant-based automotive heating system are configured to operate concurrently and in concert.

2. A thermal system according to claim 1 wherein the heating system comprises:
a heater core; and
a 3-way valve for transferring coolant to the heater core.

3. A thermal system according to claim 2 wherein the evaporator is configured to receive refrigerant previously cooled in a bi-fluidic heat exchanger, the bidirectional orifice separator including the first shutoff valve, configured to permit flow of refrigerant into the bidirectional orifice separator, the second shutoff valve configured to prevent flow of refrigerant into the bidirectional orifice separator, and the 4-way valve configured to select the bi-fluidic heat exchanger, the refrigerant-based automotive air conditioning system thus configured comprising a first refrigerant loop of the plurality of refrigerant loops operable to remove heat from ventilation air during dehumidification and transfer heat through the bi-fluidic heat exchanger to a coolant loop of the coolant-based heating system.

4. A thermal system according to claim 3, wherein the coolant loop of the plurality of coolant loops comprises a first coolant loop coupled in series between the heater core and the bi-fluidic heat exchanger, the 3-way valve configured to discharge coolant to the heater core, and the heater core configured to receive coolant from the bi-fluidic heat exchanger.

* * * * *